United States Patent
Chou

(10) Patent No.: US 9,261,167 B2
(45) Date of Patent: Feb. 16, 2016

(54) SEGMENTED SYNTHETIC ROPE STRUCTURES, SYSTEMS, AND METHODS

(71) Applicant: Samson Rope Technologies, Ferndale, WA (US)

(72) Inventor: Chia-Te Chou, Bellingham, WA (US)

(73) Assignee: SAMSON ROPE TECHNOLOGIES, Ferndale, WA (US)

(*) Notice: Subject to any disclaimer, the term of this patent is extended or adjusted under 35 U.S.C. 154(b) by 165 days.

(21) Appl. No.: 14/248,181

(22) Filed: Apr. 8, 2014

(65) Prior Publication Data

US 2014/0250856 A1  Sep. 11, 2014

Related U.S. Application Data

(63) Continuation of application No. 13/787,779, filed on Mar. 6, 2013, now Pat. No. 8,689,534.

(51) Int. Cl.
| | |
|---|---|
| *F16G 13/16* | (2006.01) |
| *F16G 13/14* | (2006.01) |
| *F16G 15/12* | (2006.01) |

(Continued)

(52) U.S. Cl.
CPC ................. *F16G 13/14* (2013.01); *B21L 11/00* (2013.01); *D07B 5/00* (2013.01); *F16G 13/12* (2013.01); *F16G 15/12* (2013.01); *D07B 1/025* (2013.01); *D07B 2201/1004* (2013.01)

(58) Field of Classification Search
CPC ......... F16G 13/12; F16G 13/14; F16G 15/12; B21L 11/00; D07B 1/025; D07B 5/00; D07B 2201/1004

USPC .................................................. 59/78, 83, 90
See application file for complete search history.

(56) References Cited

U.S. PATENT DOCUMENTS

| | | | |
|---|---|---|---|
| 429,174 A | 6/1890 | Ogilvy | |
| 568,531 A | 9/1896 | Harthan | |

(Continued)

FOREIGN PATENT DOCUMENTS

| | | |
|---|---|---|
| CA | 2019499 | 2/2000 |
| CN | 200910203184 | 6/2009 |

(Continued)

OTHER PUBLICATIONS

Pultrusion Industry Council, http://www.acmanet.org/pic/products/description.htm, "products & process: process description", 2001, 2 pages.

(Continued)

*Primary Examiner* — David B Jones
(74) *Attorney, Agent, or Firm* — Schacht Law Office, Inc.; Michael R. Schacht

(57) ABSTRACT

A rope structure has a plurality of link structures each defining first and second ends and at least one organizer member. Each first end comprises at least first and second bend portions, and each second end comprises at least third and fourth bend portions. The first end of a first one of the plurality of link structures and the second end of a second one of the plurality of link structures engages the at least one organizer member such that the first and second bend portions of the first end of the first one of the plurality of link structures are substantially parallel to each other and substantially perpendicular to the third and fourth bend portions of the second end of the second one of the plurality of link structures.

21 Claims, 7 Drawing Sheets

(51) Int. Cl.
  *B21L 11/00* (2006.01)
  *D07B 5/00* (2006.01)
  *F16G 13/12* (2006.01)
  *D07B 1/02* (2006.01)

(56) References Cited

U.S. PATENT DOCUMENTS

| | | |
|---|---|---|
| 1,257,398 A | 2/1918 | Roach |
| 1,479,865 A | 1/1924 | Metcalf |
| 1,490,387 A | 4/1924 | Hansen |
| 1,695,480 A | 12/1928 | Buoy |
| 1,710,740 A | 4/1929 | Ljungkull |
| 1,769,945 A | 7/1930 | Erkert |
| 1,833,587 A | 1/1931 | Page |
| 1,839,698 A | 1/1932 | Novotny |
| 1,850,767 A | 3/1932 | Page |
| 1,908,686 A | 5/1933 | Burke |
| 1,931,808 A | 10/1933 | Andersen |
| 2,074,956 A | 9/1935 | Carstarphen |
| 2,070,362 A | 2/1937 | Kreutz |
| 2,245,824 A | 6/1941 | Roesch |
| 2,299,568 A | 10/1942 | Dickey |
| 2,338,831 A | 1/1944 | Whitcomb et al. |
| 2,359,424 A | 10/1944 | Joy |
| 2,413,642 A | 12/1946 | Mitchell |
| 2,454,592 A | 11/1948 | Budzinski |
| 2,480,005 A | 8/1949 | Ewell |
| 2,482,204 A | 9/1949 | Peterson |
| 2,840,983 A | 7/1958 | Keilbach |
| 2,960,365 A | 11/1960 | Meisen |
| 3,035,476 A | 5/1962 | Fogden |
| 3,073,209 A | 1/1963 | Benk et al. |
| 3,276,810 A | 10/1966 | Antell |
| 3,295,303 A | 1/1967 | Beveridge |
| 3,358,434 A | 12/1967 | McCann |
| 3,367,095 A | 2/1968 | Field, Jr. |
| 3,371,476 A | 3/1968 | Costello et al. |
| 3,383,849 A | 5/1968 | Stirling |
| 3,411,400 A | 11/1968 | Morieras et al. |
| 3,415,052 A | 12/1968 | Stanton |
| 3,425,737 A | 2/1969 | Sutton |
| RE26,704 E | 11/1969 | Norton |
| 3,481,134 A | 12/1969 | Whewell |
| 3,507,949 A | 4/1970 | Campbell |
| 3,537,742 A | 11/1970 | Black |
| 3,561,318 A | 2/1971 | Andriot, Jr. |
| 3,653,295 A | 4/1972 | Pintard |
| 3,662,533 A | 5/1972 | Snellman et al. |
| 3,718,945 A | 3/1973 | Brindejonc de Treglode |
| 3,729,920 A | 5/1973 | Sayers et al. |
| 3,762,865 A | 10/1973 | Weil |
| 3,771,305 A | 11/1973 | Barnett |
| 3,839,207 A | 10/1974 | Weil |
| 3,854,767 A | 12/1974 | Burnett |
| 3,904,458 A | 9/1975 | Wray |
| 3,906,136 A | 9/1975 | Weil |
| 3,915,618 A | 10/1975 | Feucht et al. |
| 3,943,644 A | 3/1976 | Walz |
| 3,957,923 A | 5/1976 | Burke |
| 3,968,725 A | 7/1976 | Holzhauer |
| 3,977,172 A | 8/1976 | Kerawalla |
| 3,979,545 A | 9/1976 | Braus et al. |
| 4,031,121 A | 6/1977 | Brown |
| 4,036,101 A | 7/1977 | Burnett |
| 4,050,230 A | 9/1977 | Senoo et al. |
| 4,056,928 A | 11/1977 | de Vries |
| 4,099,750 A | 7/1978 | McGrew |
| 4,114,360 A | 9/1978 | Emmons |
| 4,116,481 A | 9/1978 | Raue |
| 4,155,394 A | 5/1979 | Shepherd et al. |
| 4,159,618 A | 7/1979 | Sokaris |
| 4,170,921 A | 10/1979 | Repass |
| 4,173,113 A | 11/1979 | Snellman et al. |
| 4,184,784 A | 1/1980 | Killian |
| 4,191,009 A | 3/1980 | Thomson |
| 4,195,113 A | 3/1980 | Brook |
| 4,202,164 A | 5/1980 | Simpson et al. |
| 4,210,089 A | 7/1980 | Lindahl |
| 4,226,035 A | 10/1980 | Saito |
| 4,228,641 A | 10/1980 | O'Neil |
| 4,232,619 A | 11/1980 | Lindahl |
| 4,232,903 A | 11/1980 | Welling et al. |
| 4,250,702 A | 2/1981 | Gundlach |
| 4,257,221 A | 3/1981 | Feinberg |
| 4,258,608 A | 3/1981 | Brown |
| 4,286,429 A | 9/1981 | Lin |
| 4,312,260 A | 1/1982 | Morieras |
| 4,321,854 A | 3/1982 | Foote et al. |
| 4,329,794 A | 5/1982 | Rogers |
| 4,350,380 A | 9/1982 | Williams |
| 4,375,779 A | 3/1983 | Fischer |
| 4,403,884 A | 9/1983 | Barnes |
| 4,412,474 A | 11/1983 | Hara |
| 4,414,799 A | 11/1983 | Alexander et al. |
| 4,421,352 A | 12/1983 | Raue et al. |
| 4,464,812 A | 8/1984 | Crook, Jr. et al. |
| 4,500,593 A | 2/1985 | Weber |
| 4,509,233 A | 4/1985 | Shaw |
| 4,534,163 A | 8/1985 | Schuerch |
| 4,534,262 A | 8/1985 | Swenson |
| 4,563,869 A | 1/1986 | Stanton |
| 4,606,183 A | 8/1986 | Riggs |
| 4,619,108 A | 10/1986 | Hotta |
| 4,635,989 A | 1/1987 | Tremblay et al. |
| 4,640,179 A | 2/1987 | Cameron |
| 4,642,854 A | 2/1987 | Kelly et al. |
| 4,674,801 A | 6/1987 | DiPaola et al. |
| 4,677,818 A | 7/1987 | Honda et al. |
| 4,757,719 A | 7/1988 | Franke |
| 4,762,583 A | 8/1988 | Kaempen |
| 4,779,411 A | 10/1988 | Kendall |
| 4,784,918 A | 11/1988 | Klett et al. |
| 4,850,629 A | 7/1989 | St. Germain |
| 4,856,837 A | 8/1989 | Hammersla, Jr. |
| 4,868,041 A | 9/1989 | Yamagishi et al. |
| 4,887,422 A | 12/1989 | Klees et al. |
| 4,947,917 A | 8/1990 | Noma et al. |
| 4,958,485 A | 9/1990 | Montgomery et al. |
| 4,974,488 A | 12/1990 | Spralja |
| 4,978,360 A | 12/1990 | Devanathan |
| 5,060,466 A | 10/1991 | Matsuda et al. |
| 5,091,243 A | 2/1992 | Tolbert et al. |
| 5,141,542 A | 8/1992 | Fangeat et al. |
| 5,178,923 A | 1/1993 | Andrieu et al. |
| 5,211,500 A | 5/1993 | Takaki et al. |
| D338,171 S | 8/1993 | Bichi |
| 5,240,769 A | 8/1993 | Ueda et al. |
| 5,288,552 A | 2/1994 | Hollenbaugh, Jr. et al. |
| 5,296,292 A | 3/1994 | Butters |
| 5,327,714 A | 7/1994 | Stevens et al. |
| 5,333,442 A | 8/1994 | Berger |
| 5,378,522 A | 1/1995 | Lagomarsino |
| 5,426,788 A | 6/1995 | Meltzer |
| 5,429,869 A | 7/1995 | McGregor et al. |
| 5,441,790 A | 8/1995 | Ratigan |
| 5,483,911 A | 1/1996 | Kubli |
| 5,497,608 A | 3/1996 | Matsumoto et al. |
| 5,501,879 A | 3/1996 | Murayama |
| 5,506,043 A | 4/1996 | Lilani |
| 5,525,003 A | 6/1996 | Williams et al. |
| 5,636,506 A | 6/1997 | Yngvesson |
| 5,643,516 A | 7/1997 | Raza et al. |
| 5,651,572 A | 7/1997 | St. Germain |
| 5,669,214 A | 9/1997 | Kopanakis |
| 5,699,657 A | 12/1997 | Paulson |
| 5,711,243 A | 1/1998 | Dunham |
| 5,718,532 A | 2/1998 | Mower |
| 5,727,833 A | 3/1998 | Coe |
| 5,802,839 A | 9/1998 | Van Hook |
| 5,822,791 A | 10/1998 | Baris |
| 5,826,421 A | 10/1998 | Wilcox et al. |
| 5,852,926 A | 12/1998 | Breedlove |
| 5,873,758 A | 2/1999 | Mullins |
| 5,904,438 A | 5/1999 | Vaseghi et al. |

(56) References Cited

U.S. PATENT DOCUMENTS

| | | | |
|---|---|---|---|
| 5,931,076 A | 8/1999 | Ryan |
| 5,943,963 A | 8/1999 | Beals |
| 5,978,638 A | 11/1999 | Tanaka et al. |
| 6,015,618 A | 1/2000 | Orima |
| 6,033,213 A | 3/2000 | Halvorsen, Jr. |
| 6,045,571 A | 4/2000 | Hill et al. |
| 6,085,628 A | 7/2000 | Street et al. |
| 6,122,847 A | 9/2000 | Treu et al. |
| 6,146,759 A | 11/2000 | Land |
| 6,164,053 A | 12/2000 | O'Donnell et al. |
| 6,265,039 B1 | 7/2001 | Drinkwater et al. |
| 6,295,799 B1 | 10/2001 | Baranda |
| 6,341,550 B1 | 1/2002 | White |
| 6,365,070 B1 | 4/2002 | Stowell et al. |
| 6,405,519 B1 | 6/2002 | Shaikh et al. |
| 6,410,140 B1 | 6/2002 | Land et al. |
| 6,422,118 B1 | 7/2002 | Edwards |
| 6,484,423 B1 | 11/2002 | Murray |
| 6,524,690 B1 | 2/2003 | Dyksterhouse |
| 6,575,072 B2 | 6/2003 | Pellerin |
| 6,592,987 B1 | 7/2003 | Sakamoto et al. |
| 6,601,378 B1 | 8/2003 | Fritsch et al. |
| 6,704,535 B2 | 3/2004 | Kobayashi et al. |
| 6,876,798 B2 | 4/2005 | Triplett et al. |
| 6,881,793 B2 | 4/2005 | Sheldon et al. |
| 6,916,533 B2 | 7/2005 | Simmelink et al. |
| 6,945,153 B2 | 9/2005 | Knudsen et al. |
| 7,051,664 B2 | 5/2006 | Robichaud et al. |
| 7,093,416 B2 | 8/2006 | Johnson et al. |
| 7,107,749 B2 | 9/2006 | Wetzels et al. |
| 7,127,878 B1 | 10/2006 | Wilke et al. |
| 7,134,267 B1 | 11/2006 | Gilmore et al. |
| 7,137,617 B2 | 11/2006 | Sjostedt |
| 7,165,485 B2 | 1/2007 | Smeets et al. |
| 7,168,231 B1 | 1/2007 | Chou et al. |
| 7,172,878 B1 | 2/2007 | Nowak et al. |
| 7,182,900 B2 | 2/2007 | Schwamborn et al. |
| 7,296,394 B2 | 11/2007 | Clough et al. |
| 7,331,269 B2 | 2/2008 | He et al. |
| 7,367,176 B1 | 5/2008 | Gilmore et al. |
| 7,389,973 B1 | 6/2008 | Chou et al. |
| 7,415,783 B2 | 8/2008 | Huffman et al. |
| 7,437,869 B1 | 10/2008 | Chou et al. |
| 7,472,502 B2 | 1/2009 | Gregory et al. |
| 7,475,926 B2 | 1/2009 | Summars |
| D592,537 S | 5/2009 | Darnell |
| 7,568,419 B2 | 8/2009 | Bosman |
| 7,637,549 B2 | 12/2009 | Hess |
| 7,681,934 B2 | 3/2010 | Harada et al. |
| 7,735,308 B1 | 6/2010 | Gilmore et al. |
| 7,739,863 B1 | 6/2010 | Chou et al. |
| 7,743,596 B1 | 6/2010 | Chou et al. |
| 7,784,258 B2 | 8/2010 | Hess |
| 7,823,496 B2 | 11/2010 | Bosman et al. |
| 7,849,666 B2 | 12/2010 | Kirth et al. |
| 7,908,955 B1 | 3/2011 | Chou et al. |
| 7,918,079 B2 | 4/2011 | Bloch |
| 8,109,071 B2 | 2/2012 | Gilmore |
| 8,109,072 B2 | 2/2012 | Chou et al. |
| 8,171,713 B2 | 5/2012 | Gilmore et al. |
| 8,171,714 B2 | 5/2012 | Wienke et al. |
| 8,250,845 B2 | 8/2012 | Kimura et al. |
| 8,302,374 B2 | 11/2012 | Marissen et al. |
| 8,341,930 B1 | 1/2013 | Chou et al. |
| 8,381,504 B2 | 2/2013 | Pettersen |
| 8,387,505 B2 | 3/2013 | Chou et al. |
| 8,418,434 B1 | 4/2013 | Carruth et al. |
| 8,511,053 B2 | 8/2013 | Chou et al. |
| 8,689,534 B1 | 4/2014 | Chou |
| 8,707,666 B2 | 4/2014 | Crozier et al. |
| 8,707,668 B2 | 4/2014 | Gilmore et al. |
| 2003/0200740 A1 | 10/2003 | Tao et al. |
| 2003/0226347 A1 | 12/2003 | Smith et al. |
| 2004/0025486 A1 | 2/2004 | Takiue |
| 2004/0069132 A1 | 4/2004 | Knudsen et al. |
| 2005/0172605 A1 | 8/2005 | Vancompernolle et al. |
| 2005/0279074 A1 | 12/2005 | Johnson et al. |
| 2006/0048494 A1 | 3/2006 | Wetzels et al. |
| 2006/0048497 A1 | 3/2006 | Bloch |
| 2006/0179619 A1 | 8/2006 | Pearce et al. |
| 2006/0213175 A1 | 9/2006 | Smith et al. |
| 2007/0079695 A1 | 4/2007 | Bucher et al. |
| 2007/0137163 A1 | 6/2007 | Hess |
| 2007/0144134 A1 | 6/2007 | Kajihara |
| 2007/0169457 A1 | 7/2007 | Kijesky |
| 2007/0266693 A1 | 11/2007 | Kato et al. |
| 2008/0299855 A1 | 12/2008 | Morihashi |
| 2009/0047475 A1 | 2/2009 | Jeon |
| 2009/0282801 A1 | 11/2009 | Gilmore |
| 2011/0067275 A1 | 3/2011 | Doan |
| 2011/0083415 A1 | 4/2011 | Marissen et al. |
| 2011/0192132 A1 | 8/2011 | Kimura et al. |
| 2011/0197564 A1 | 8/2011 | Zachariades et al. |
| 2011/0269360 A1 | 11/2011 | Mueller |
| 2012/0121843 A1 | 5/2012 | Lebel et al. |
| 2012/0198808 A1 | 8/2012 | Bosman et al. |
| 2012/0244333 A1 | 9/2012 | Aksay et al. |
| 2012/0260620 A1 | 10/2012 | Kim et al. |
| 2012/0266583 A1 | 10/2012 | Crozier et al. |
| 2012/0297746 A1 | 11/2012 | Chou et al. |
| 2013/0174719 A1 | 7/2013 | Chou et al. |
| 2014/0000233 A1 | 1/2014 | Chou et al. |

FOREIGN PATENT DOCUMENTS

| | | |
|---|---|---|
| DE | 7315621 | 10/1973 |
| EP | 1397304 A1 | 3/2004 |
| EP | 1659209 | 5/2006 |
| EP | 2028308 | 2/2009 |
| EP | 2130969 | 12/2009 |
| FR | 2197392 | 3/1974 |
| GB | 312464 | 5/1929 |
| JP | 469565 | 4/1971 |
| JP | S57161116 A | 10/1982 |
| JP | 1260080 | 10/1989 |
| JP | 2242987 | 9/1990 |
| JP | 3033285 | 2/1991 |
| JP | 2000212884 | 8/2000 |
| JP | 2004126505 | 4/2001 |
| JP | 2009293181 | 12/2009 |
| JP | 3158927 | 4/2010 |
| KR | 1019900010144 | 7/1990 |
| KR | 1020090044381 | 5/2009 |
| RU | 2100674 | 12/1997 |
| RU | 2295144 | 10/2007 |
| RU | 2425187 C2 | 7/2011 |
| SU | 436115 | 12/1975 |
| SU | 618061 | 7/1978 |
| SU | 1647183 | 5/1991 |
| WO | 03102295 | 12/2003 |
| WO | 2004021771 A2 | 3/2004 |
| WO | 2005075559 A1 | 8/2005 |
| WO | 2008144046 | 11/2008 |
| WO | 2008144047 | 11/2008 |
| WO | 2008144048 | 11/2008 |
| WO | 2013134033 A1 | 9/2013 |
| ZA | 2009008815 | 8/2010 |

OTHER PUBLICATIONS

H. A. McKenna et al., "Handbook of fibre rope technology", 2004, pp. 88, 89, 100, Woodhead Publishing Limited, England, CRC Press LLC, USA.

Samson Rope Technologies, Inc., "Dynalene Installation Instructions for Covering 12-Strand Rope", 2005, 12 pages.

ENTEC, http://www.entec.com/pultrusion.shtml, "Pultrusion Equipment", Nov. 2006, 4 pages.

Samson Rope Technologies, Inc., "Innovative Chafe Protection Solutions for High Performance Ropes", 2006, 4 pages.

Tencom Ltd., http://www.tencom.com/02/pultrusion.htm, "Pultrusion Process", 2006, 2 pages.

(56) References Cited

OTHER PUBLICATIONS

Kaneya Seiko Co., Ltd., "Super Triple Cross Rope", 2007, 3 pages.
Samson Rope Technologies, Inc., "Samson Deep Six Performs Beyond Expectation", Sep. 10, 2008, 2 pages.
Samson Rope Technologies, Inc., "M-8 Offshore Rope", Mar. 2008, 1 page.
Samson Rope Technologies, Inc., "Samson Offshore Expansion Celebrated", Feb. 18, 2009, 2 pages.
Timberland Equipment Limited, "Gatortail Rope Synthetic Pulling Rope", 2010, 5 pages.
Bridon, "Fibre Rope Catalogue: M Steel Winchline", 2011, p. 17.
Bridon, "Fibre Rope Catalogue: TQ12", 2011, p. 18.
Pasternak, Shelton, & Gilmore, "Synthetic 'Mud Ropes' for Offshore Mooring Applications—Field History and Testing Data", Sep. 2011, 8 pages.
Samson Rope Technologies, Inc., "Offshore Product and Technical Guide", Jul. 2011, 8 pages.
US District Court, *Samson Rope Technologies, Inc.* v. *Yale Cordage, Inc.* Case 2:11-cv-00328, Document 1, Complaint (2), DI 001-2011-02-24, 5 pages.
US District Court, *Samson Rope Technologies, Inc.* v. *Yale Cordage, Inc.* Case 2:11-cv-00328-JLR, Document 5, Notice to PTO, DI 005-2011-02-25, 1 page.
US District Court, *Samson Rope Technologies, Inc.* v. *Yale Cordage, Inc.* Case 2:11-cv-00328-JLR, Document 12, Answer, DI 012-2011-05-10, 6 pages.
Samson Rope Technologies, Inc., www.samsonrope.com/Pages/Product.aspx?ProductID=825, "Tenex-Tec", 2012, 1 page.
Herzog Braiding Machines, "Rope Braiding Machines Seng 140 Series", 2 pages.
Herzog Braiding Machines, "Rope Braiding Machines Seng 160 Series", 2 pages.
International Searching Authority, ISR PCT/US2014020529, Jun. 10, 2014, 7 pages.
International Searching Authority, ISR PCT/US2014023749, Jun. 26, 2014, 7 pages.
International Searching Authority, ISR PCT/US2014026726, Jun. 19, 2014, 7 pages.
Wire Rope Technical Board, "Mechanical Splice (Flemish eye)," Wire Rope Sling Users Manual, Third Edition, 2007, p. 12, WRBT Publications, USA.

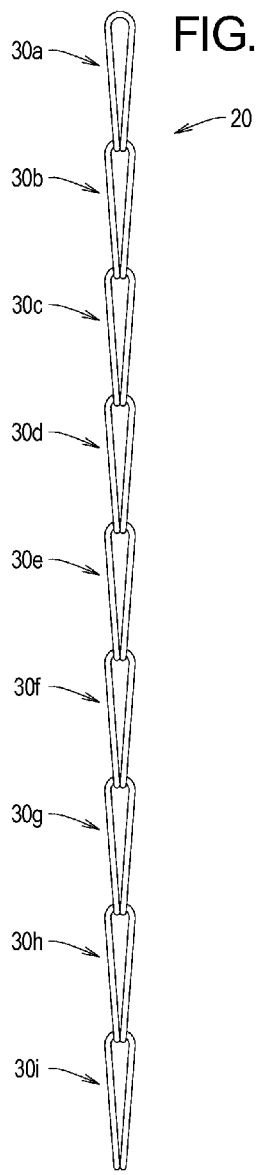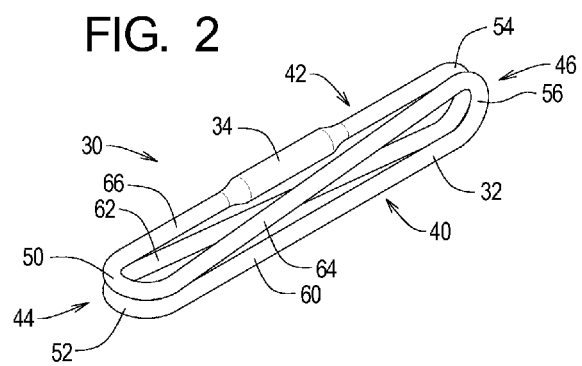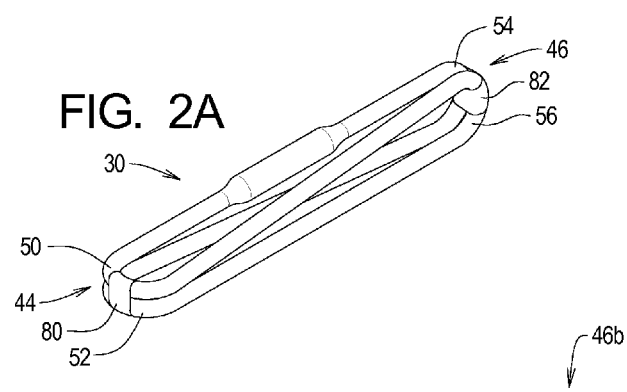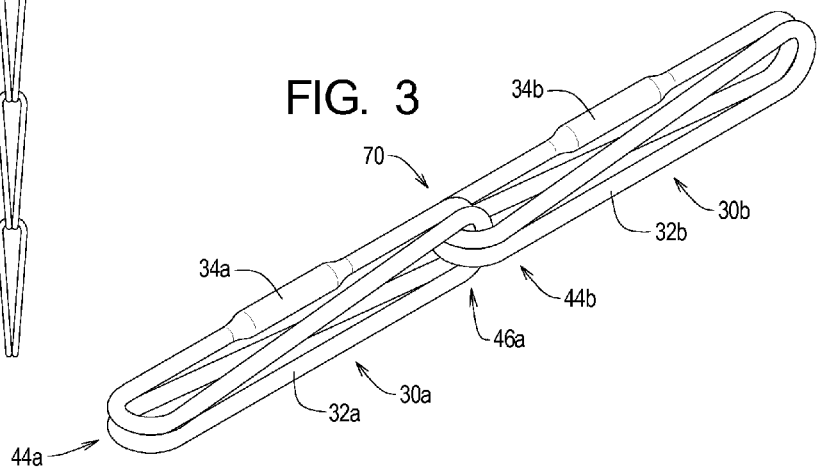

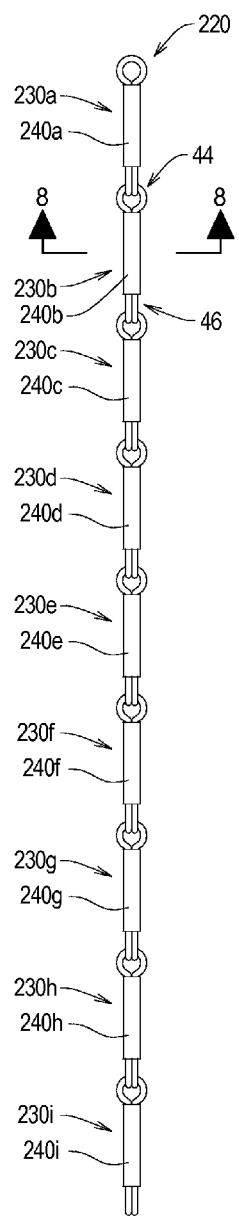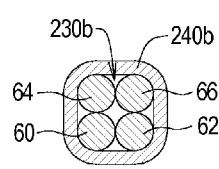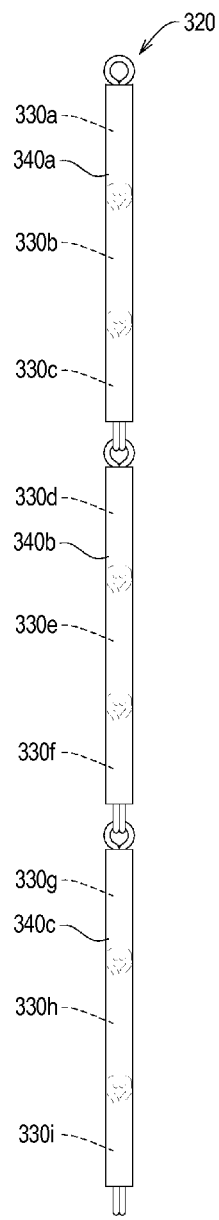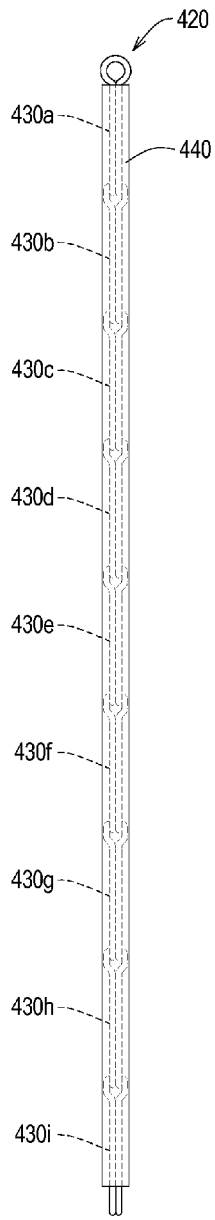

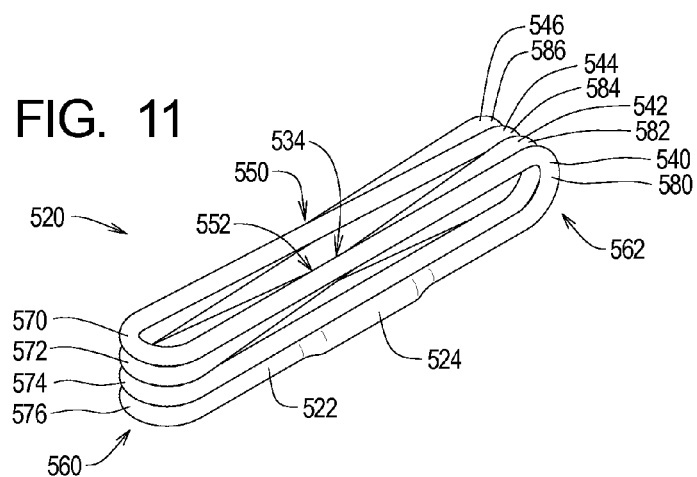
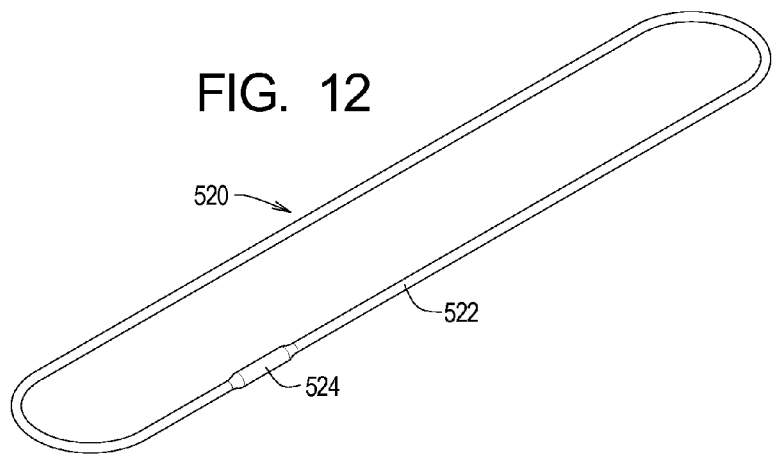
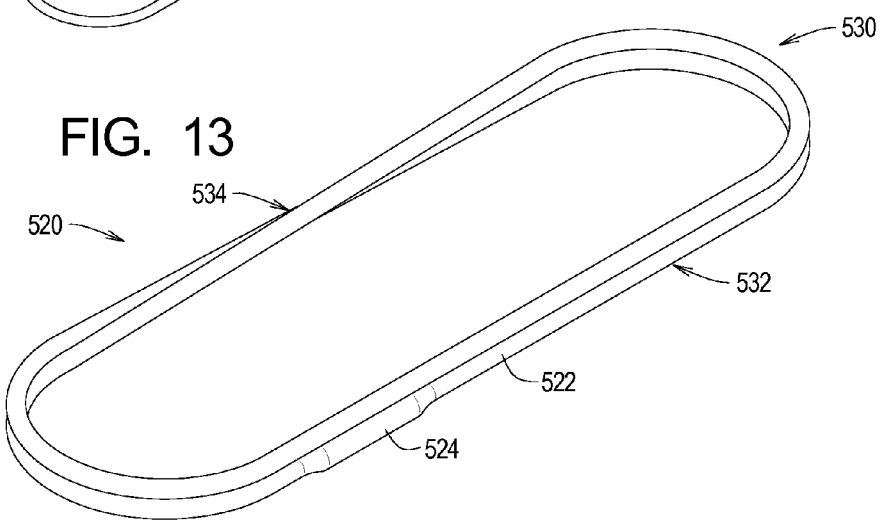

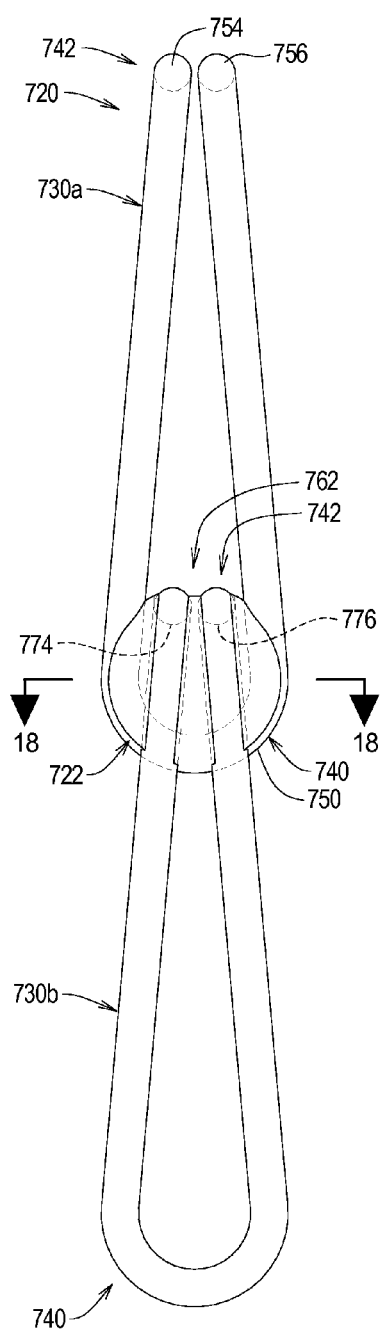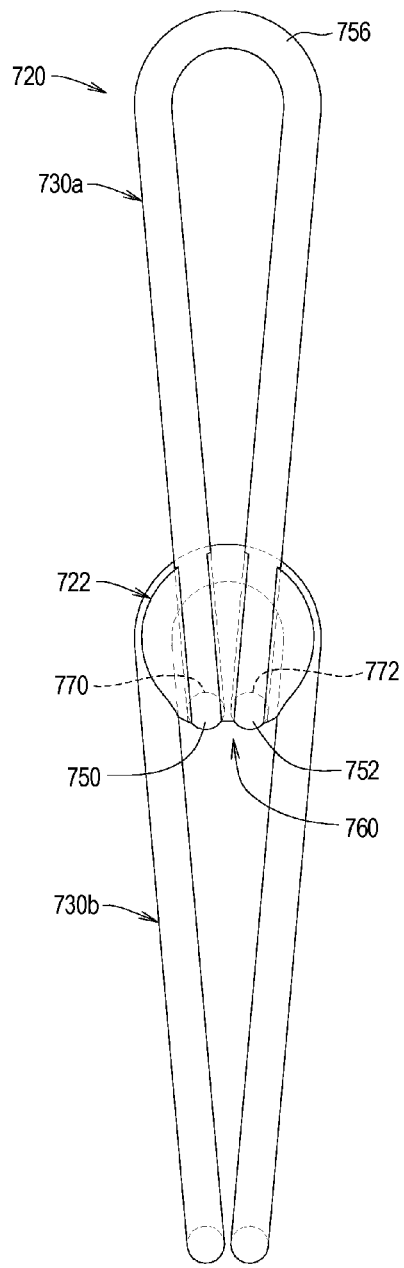

SEGMENTED SYNTHETIC ROPE STRUCTURES, SYSTEMS, AND METHODS

RELATED APPLICATIONS

This application, is a continuation of U.S. patent application Ser. No. 13/787,779 filed Mar. 6, 2013, currently pending, the contents of which are incorporated herein by reference.

TECHNICAL FIELD

The present invention relates to elongate tension members and, more particularly, to segmented synthetic rope structures, systems, and methods.

BACKGROUND

Rope structures are typically tension members formed by laid, braided, or woven fibers. The fibers, typically synthetic fibers, extend along at least a portion of the rope structure. In many situations, the rope structure may only be effectively shortened by modifying the splices or by cutting the fibers. Cutting fibers permanently alters the rope structure, and forming a resplice may be too time consuming or cannot be easily performed in the field. On the other hand, a rope structure may be lengthened only by splicing or otherwise joining together two lengths of rope structures. Splicing can change the characteristics of the rope structure, especially at the termination region. Other methods of changing rope length are more difficult to implement than splicing, and such ropes must be specially designed to allow the length of the rope to be freely changed, with limitations on how much change can be accomplished. Accordingly, altering the length of rope structures is difficult, especially when lengthening a rope structure in the field. Often, the entire rope is thus typically replaced when a longer or shorter rope is required.

Another aspect of typical ropes is that it is difficult to apply a tension force on the rope at locations along the body of the rope other than special terminations formed at the ends of the rope.

Chains have long been made of closed metal or plastic links that are joined together to form a chain structure of a required length. A chain may be lengthened by adding links and shortened by removing links. Further, a tension load may be applied to the body of the chain at locations spaced from the ends of the chain by inserting an appropriate connector through an open link. However, adding and removing links typically requires advanced metalworking techniques that are not feasible under most field conditions. Further, metal chains are not appropriate for many environments in which the weight and operational characteristics of a metal chain are inappropriate. Plastic may also be difficult to alter in the field and is too weak for many applications.

The need thus exists for improved rope structures, systems, and methods that can be made of synthetic fibers, can easily be lengthened or shortened in the field without a special rope design or by splicing or permanently altering the rope by cutting the fibers, and which allow a tension load to be applied to the body of the rope away from the ends of the rope.

SUMMARY

The present invention may be embodied as a rope structure comprising a plurality of link structures each defining first and second ends and at least one organizer member. Each first end comprises at least first and second bend portions, and each second end comprises at least third and fourth bend portions. The first end of a first one of the plurality of link structures and the second end of a second one of the plurality of link structures engages the at least one organizer member such that the first and second bend portions of the first end of the first one of the plurality of link structures are substantially parallel to each other and substantially perpendicular to the third and fourth bend portions of the second end of the second one of the plurality of link structures.

The present invention may also be embodied as a method of forming rope structure comprising the following steps. A plurality of link members formed of synthetic fibers are provided, and at least two of the link members are configured to form first and second link structures each comprising at least first and second bend portions defining a first end of the link structure and at least third and fourth bend portions defining a second end of the link structure. At least one organizing member is provided. The first end of the first one of the plurality of link structures and the second end of the second one of the plurality of link structures are engaged with the at least one organizer member such that the first and second bend portions of the first end of the first one of the plurality of link structures are substantially parallel to each other and substantially perpendicular to the third and fourth bend portions of the second end of the second one of the plurality of link structures.

The present invention may also be embodied as a rope structure comprising a plurality of link members and at least one organizer member. The link members are formed of synthetic fibers spliced at a termination region to form an endless rope structure. Each endless rope structure is folded to form a link structure defining first and second ends. Each first end comprises at least first and second bend portions, and each second end comprises at least third and fourth bend portions. The first end of a first one of the plurality of link structures engages and the second end of a second one of the plurality of link structures engages the at least one organizer such that the first and second bend portions of the first end of the first one of the plurality of link structures are substantially parallel to each other, substantially perpendicular to the third and fourth bend portions of the second end of the second one of the plurality of link structures, and the termination region is arranged outside of the first, second, third, and fourth bend portions.

The present invention may also be embodied as a rope structure comprising a plurality of link structures each defining first and second ends, where each link structure is formed of synthetic fibers, each first end comprises at least first and second bend portions, each second end comprises at least third and fourth bend portions, at least one link structure comprises a link member, and a jacket covers at least a portion of the link member. The first end of a first one of the plurality of link structures engages the second end of a second one of the plurality of link structures such that the first and second bend portions of the first end of the first one of the plurality of link structures are substantially parallel to each other and substantially perpendicular to the third and fourth bend portions of the second end of the second one of the plurality of link structures.

The present invention may also be embodied as a method of forming rope structure comprising the following steps. A plurality of link members formed of synthetic fibers is provided. At least two of the link members are configured to form first and second link structures each comprising at least first and second bend portions defining a first end of the link structure and at least third and fourth bend portions defining a second end of the link structure. The first end of the first one of the plurality of link structures is engaged with the second end of the second one of the plurality of link structures such that the first and second bend portions of the first end of the first one of the plurality of link structures are substantially parallel to each other and substantially perpendicular to the third and fourth bend portions of the second end of the second one of the plurality of link structures. A jacket is arranged to cover at least a portion of the link member.

BRIEF DESCRIPTION OF THE DRAWINGS

FIG. 1 is a side elevation view of a first example rope structure of the present invention;

FIG. 2 is a perspective view of a single first example link structure that may be used to form part of the first example rope structure;

FIG. 2A is a perspective view of the first example link structure further including first and second organizer structures;

FIG. 3 is a perspective view of two first example link structures that have been combined to form part of the first example rope structure;

FIG. 7 is a side elevation view of a second example rope structure of the present invention;

FIG. 8 is a section view taken along lines 8-8 in FIG. 7;

FIG. 9 is a side elevation view of a third example rope structure of the present invention;

FIG. 10 is a side elevation view of a fourth example rope structure of the present invention;

FIG. 11 is a perspective view of a second example link structure that may be used to form part of a fifth example rope structure;

FIG. 12 is a perspective view of a second example link member that may be used to form the second example link structures;

FIG. 13 is a perspective view of the second example link member folded into a first intermediate configuration;

FIGS. 16 and 17 are top and side plan views of a fifth example rope structure of the present invention.

DETAILED DESCRIPTION

Figure 4:
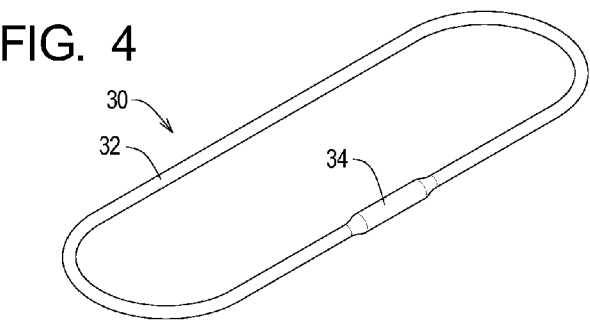
FIG. 4 is a perspective view of a first example link member that may be used to form the first example link structures of the first example rope structure.

Referring initially to FIG. 1 of the drawing, depicted therein is a first example rope structure 20 comprising a plurality of first example link structures 30. In particular, as depicted in FIG. 1, the first example rope structure 20 comprises nine link structures 30a, 30b, 30c, 30d, 30e, 30f, 30g, 30h, and 30i. Fewer or more link members can be combined to create rope structures shorter or longer than the example rope structure 20. In addition, the lengths of the individual link structures 30 may be determined, in conjunction with the number of links, to determine the length of a particular rope structure as required.

At this point, it should be noted that numerical reference characters used in this application without letter suffixes refer to components generically, while the same numerical reference characters used with letter suffixes refer to specific components of the examples depicted in the drawing. In this context, any numerical reference character used in the written specification without an appended letter suffix is supported by that same numerical reference character used with an appended letter suffix in the drawing.

As perhaps best shown in FIGS. 2-4, each of the first example link structures 30 is formed by a link member 32. The example link members 32 are formed by lengths of fibers combined into a sub-structure and spliced at a termination region 34 such that each of the link members 32 is what is commonly referred to as an endless rope. The term "termination region" as used herein refers to conventional a juncture formed by traditional methods of splicing or interweaving fiber ends to form a mechanical bond between fiber ends. The term "termination region" may also refer to other methods of joining together ends of a rope to form an endless loop such as the use of mechanical devices, pot fittings, swaging, or the like. The endless rope sub-structure forming the link member 32 may be laid, braided, or woven. In the example link member 32, the fibers may be continuous along the entire length of the link member 32 outside of the termination region 34. Alternatively, only some of the fibers may be continuous along the entire length of the link member 32 outside of the termination region 34 and the remaining fibers are not continuous along the entire length of the link member 32 outside of the termination region 34. In some situations, the link member 32 may be formed of discontinuous fibers none of which are continuous along the entire length of the link member 32 outside of the termination region 34.

Alternatively, the link members may be formed by laying or intertwining one or more fibers in a continuous loop such that fibers mechanically interlock to provide consistent tensile strength at any point along the length of the link member. In another form, the individual fiber bundles may be formed in a closed loop and combined such that the fiber bundles are generally parallel to each other. Such parallel fiber bundles may be contained within a jacket in a form similar to what is commonly referred to as a round sling. In any of these examples, the link members do not define a single termination region such as the termination region 34 formed by the example link member 32.

The fibers used to form the example link structures 30 are synthetic fibers continuous fibers made of one or more materials such as Nylon, Polyester, High Modulus Polypropylene (HMPP) fiber (e.g., Innegra), Olefin, High Modulus Polyethylene (HMPE) fiber (e.g., Dnyeema, Spectra), Polyacrylonitrile fiber (e.g., Orlon), Carbon fiber, Aramid fiber (e.g., Twaron, Kevlar, Technora, Teijinconex), PBO (Poly(p-phenylene-2,6-benzobisoxazole) fiber (e.g., Zylon), LCP fiber (e.g., Vectran), PIPD (Poly[2,6-diimidazo (4,5-b:4',5'-e) pyridinylene-1,4(2,5-dihydroxy) Phenylen]) fiber (e.g., M5), PBI (Polybenziadazole) fiber, PEN (Polyethylene Naphthalate) fiber (e.g., Pentex), Glass fiber, Basalt fiber, Metallic fiber, PVC (Polyvinyl Chloride) fiber (e.g., Vinyon), PVDC (Polyvinylidene Chloride) fiber (e.g., Saran), Polyurethane-polyurea fiber (e.g., Spandex, Lycra), Polyvinyl Alchohol fiber (e.g., Vinalon), PPS (Polyphylene Sulfide) fiber (e.g. Ryton), and the like.

The details of the splice formed at the termination region 34 employed by the example link member 32 depend on the size, construction, and materials used to form the link member 32. The splices used to form the link members 32 may be formed at the factory under controlled conditions. In this case, the consistency of the tensile strength of the link members 32 may controlled and verified before the link member 32 is configured as a link structure 30 and combined with other link structures 30 to form the example rope structure 20 as will be described in further detail below. And as generally described above, the link members of the present invention may be formed by a continuous loop of fibers laid without a clearly defined termination region.

Referring now to FIG. 2, the details of the example link structures 30 will now be described in further detail. In particular, portions of the link members 32 are folded back onto each other such that each of the example link structures 30 defines first and second loop portions 40 and 42 and first and second end portions 44 and 46. So folded, each example link structure 30 defines first and second bend portions 50 and 52, third and fourth bend portions 54 and 56, first and second lower side portions 60 and 62, and first and second upper side portions 64 and 66. As depicted in FIG. 2, the first and second bend portions 50 and 52 are substantially parallel to a horizontal plane (lateral), while the third and fourth bend portions 54 and 56 are substantially parallel to a vertical plane (vertical). When used in this discussion, the terms "lateral", "vertical", "upper", and "lower" are not used in an absolute sense. Instead, these terms are used as convenient labels with reference to a particular orientation of the link structures 30 as depicted in FIGS. 2 and 3. In actual use of the example rope structure 20, the various components identified using the terms "lateral", "vertical", "upper", and "lower" may take other orientations inconsistent with absolute definitions of those terms.

As shown in FIG. 2, in the example the first loop portion 40 is defined by the first lower side portion 60 and the first upper side portion 64. The second loop portion 42 is defined by the second lower side portion 62 and the second upper side portion 66. The first end portion 44 is defined by the first and second lateral bend portions 50 and 52. The second end portion 46 is defined by the third and fourth bend portions 54 and 56.

As depicted in FIG. 3, any two connected link structures 30 will form a link juncture 70 where a first end 44b of a second link structure 30b engages a second end 46a of a first link structure 30a. In particular, after the first link member 32a is folded into the first link structure 30a, the second link member 32b is similarly folded to form the second loop structure 30b and arranged such that the first end 44b thereof is between the loop portions 40a and 42a and adjacent to the second end 46a of the first loop structure 30a. Successive link structures 30 are similarly linked together to form the entire first example rope structure 20. The link junctures 70 may be formed by direct contact between the fibers forming the link members 32 at the portions 44a, 44b and/or 46a, 46b or, the fibers forming end portions 44a, 44b and/or 46a, 46b may indirectly engage each other through a termination region and/or organizer structure as generally described elsewhere in this application.

So linked together, each of the individual example link structures 30 forming the example rope structure 20 will tend to take the configuration as generally depicted in FIGS. 2 and 3 when the rope structure 20 is placed under tension. At the link juncture 70, the third and fourth bend portions 54 and 56 of the second end 46a are substantially parallel to each other, the lateral bend portions 50 and 52 of the first end 44b are substantially parallel to each other, and the third and fourth bend portions 54 and 56 of the second end 46b are substantially perpendicular to each the first and second bend portions 50 and 52 of the first end 44b. This configuration evenly distributes tension loads along the lengths of each of the link members 32a and 32b and also evenly transfers tension loads along the length of the rope structure 20 from one link structure 30a to the other link structure 30b. Crossing of the bend portions 50 and 52 and the bend portions 54 and 56 is preferably avoided when placing the first example rope structure 20 under tension to reduce wear on the link members 32a and 32b.

FIG. 2A illustrates an alternative configuration of the link structure 30 in which first and second organizer structures 80 and 82 are arranged adjacent to each of the first and second end portions 44 and 46, respectively. The first and second organizer structures 80 and 82 organize the portions 50 and 52 forming the first end portion 44 and the portions 54 and 56 forming the second end portion 46 to reduce the likelihood that the portions 50 and 52 and portions 54 and 56 will cross at the end portions 44 and 46. The organizer structures 80 and 82 may take many forms, such as straps sewn in place adjacent to the end portions 44 and 46, resilient bands through which the end portions 44 and 46 are inserted, plastic clips that are snapped in place adjacent to the end portions 44 and 46, and/or an adhesive material that is sprayed or squirted in a liquid form adjacent to the end portions 44 and 46 and allowed to dry.

In the example link structure 30 described above, the termination region 34 is arranged at one of the side portions 60-66 and not at one of the end portions 44 or 46. In particular, the termination region 34 is typically thicker and less flexible than the rest of rope structure forming the link member 32. This relatively thick, inflexible termination region 34 may result in increased wear between the adjacent link structures 30a and 30b at the link juncture 70 if arranged at the end portions 44a, 44b and/or 46a, 46b. By arranging the termination region at the side portions 60-66, the interaction of adjacent link structures 30 such as the link structures 30a and 30b in FIG. 3 is controlled in a manner that is likely to reduce wear on the link structures 30a and 30b at the link juncture 70.

Alternatively, the termination region 34 may be specifically arranged at one of the end portions 44a, 44b and/or 46a, 46b if the termination region is specifically engineered to handle the increased wear formed at the junctures 70 of adjacent link structures 32. For example, a mechanical or swaged termination portion may be formed to protect the fibers at the end portions 44a, 44b and/or 46a, 46b and also to perform a function similar to the example organizer structures 80 and 82 discussed above.

As should be apparent from the foregoing discussion, the first example rope structure 20 may made as long or as short as necessary for a particular environment by adding or removing link structures 30. Further, the link structures 30 are configured to reduce wear on the fibers of the link members 32 forming the link structures 30. The first example rope structure 20 thus exhibits most of the positive aspects of a conventional synthetic fiber rope while minimizing the negative aspects of such synthetic fiber ropes. Similarly, the first example rope structure 20 exhibits many of the positive aspects of a conventional metal chain while minimizing the negative aspects of such metal chains.

Figure 5:
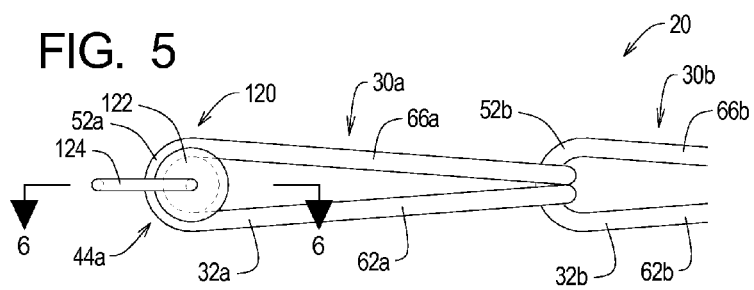
FIG. 5 is a side elevation view of a first example termination system that may be used with a rope structure of the present invention.
Figure 6:
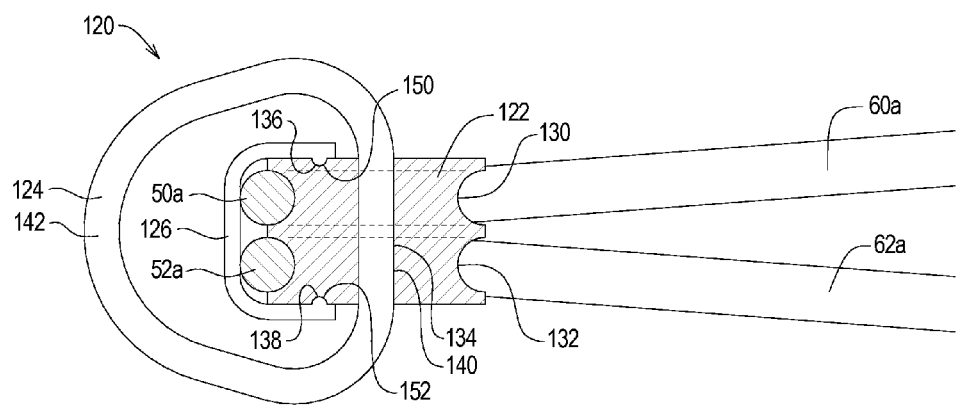
FIG. 6 is a section view taken along lines 6-6 in FIG. 5.

Turning now to FIGS. 5 and 6 of the drawings, depicted therein is an example termination system 120 that may be used with the first example rope system 20. The termination system 120 comprises a sheave member 122, a coupler member 124, and a retainer member 126. The sheave member 122 is a disc-shaped block of rigid material defining first and second grooves 130 and 132 along its circular edge and a sheave bore 134 along its axis of rotation. First and second clip cavities 136 and 138 are formed on opposing flat surfaces of the sheave member 122. The example coupler member 124 is a length of material defining a bore portion 140 capable of extending at least partly through the sheave bore 134 and an attachment portion 142 extending around at least a portion of the sheave member 122. The example clip member 126 is a U-shaped member defining first and second clip projections 150 and 152. The example clip member 126 is sized and dimensioned such that, with the clip 150 and 152 received by the clip cavities 136 and 138, respectively, the clip member 126 is capable of extending around at least a portion of the sheave member 122.

In use, the first end 44a of the first or end link structure 30a of the example rope structure 20 is arranged such that the first and second or lateral bend portions 50a and 52a of the link structure 30a are received by a portion of the first and second grooves 130 and 132, respectively. Portions of the side portions 60a and 64a and 62a and 66a of the link structure 30a are received by a portion of the first and second grooves 130 and 132, respectively. The coupler member 124 is then arranged such that the bore portion 140 of the coupler member 124 engages the sheave bore 134 such that loads applied to the attachment portion 142 of the coupler member 124 are transferred to the sheave member 122. In turn, loads on the sheave member 122 are transferred to the link structure 30a through the first and second bend portions 50a and 52a and portions of the side portions 60a, 62a, 64a, and 66a. The clip member 126 extends over the first and second bend portions 50a and 52a to reduce the likelihood that these bend portions 50a and 52a do not stay in the grooves 130 and 132.

The termination system 120 thus distributes the forces applied to the coupler member 124 over a relatively broad surface area of the link member 32a forming the link structure 30a, thereby reducing wear on the link structure 30a.

Referring now to FIGS. 7 and 8 of the drawings, depicted therein is a second example rope structure 220 comprising a plurality of second example link structures 230. The link structures 230 may be constructed in the same manner as the first example link structures 30 described above. As depicted in FIG. 7, the second example rope structure 220 comprises nine link structures 230a, 230b, 230c, 230d, 230e, 230f, 230g, 230h, and 230i. Fewer or more link members 230 can be combined to create rope structures shorter or longer than the example rope structure 220. In addition, the lengths of the individual link structures 230 may be determined, in conjunction with the number of link structures 230, to determine the length of a particular rope structure as required.

FIGS. 7 and 8 illustrate that the second example rope structure 220 further comprises a jacket structure 240 associated with each of the link structures 230a, 230b, 230c, 230d, 230e, 230f, 230g, 230h, and 230i. In particular, the example rope structure 220 comprises nine jacket structures 240a, 240b, 240c, 240d, 240e, 240f, 240g, 240h, and 240i. The jacket structures 240 are configured to extend along a substantial portion of the side portions 60, 62, 64, and 66 of the link structures 230, terminating adjacent each of the end portions 44 and 46 of the link structures 230.

The example jacket structures 240 may be made of a number of materials and manufacturing techniques. Examples include synthetic fiber fabric sewn into a tubular shape, a synthetic fiber rope structure woven or braided over the link structures 230 in a tubular shape, rigid or elastic tubes formed of material such as plastic, latex, or rubber, and/or a coating applied to the link structures 230 and allowed to harden in situ to form a rigid or elastic tube.

The jacket structures 240 facilitate handling of the individual link structures and, like the organizer members 80 and 82 described above, reduce the likelihood that bend portions of the link structures will cross at the link junctures formed by adjacent links.

Referring now to FIG. 9 of the drawings, depicted therein is a third example rope structure 320 comprising a plurality of third example link structures 330. The third example link structures 330 may be constructed in the same manner as the first example link structures 30 described above. The third example rope structure 320 comprises nine link structures 330a, 330b, 330c, 330d, 330e, 330f, 330g, 330h, and 330i. Again, the lengths of the individual link structures 330 and or the number of link structures 330 determine the length of a particular rope structure as required.

The third example rope structure 320 further comprising a jacket structure 340 associated with each of a first group of link structures 330a, 330b, and 330c, a second group of link structures 330d, 330e, and 330f, and a third group of link structures 330g, 330h, and 330i. In particular, the example rope structure 320 comprises three jacket structures 340a, 340b, and 340c. For each group of link structures 330, the jacket structures 340 are configured to extend from one end portion of a first end link structure, over an entire intermediate link structure, and to an end of portion of a second end link structure.

The example jacket structures 340 may be made of a number of materials and manufacturing techniques. Examples include synthetic fiber fabric sewn into a tubular shape, a synthetic fiber rope structure woven into a tubular shape, rigid or elastic tubes formed of material such as plastic, latex, or rubber, and/or a coating applied to the link structures 330 and allowed to harden in situ to form a rigid or elastic tube.

The jacket structures 340 facilitate handling of the groups comprising a plurality of link structures and, like the organizer members 80 and 82 described above, reduce the likelihood that bend portions of the link structures will cross at the link junctures formed by adjacent links.

Referring now to FIG. 10 of the drawings, depicted therein is a fourth example rope structure 420 comprising a plurality of fourth example link structures 430. The fourth example link structures 430 may be constructed in the same manner as the first example link structures 30 described above. The fourth example rope structure 420 comprises nine link structures 430a, 430b, 430c, 430d, 430e, 430f, 430g, 430h, and 430i. Again, the lengths of the individual link structures 430 and or the number of link structures 430 to determine the length of a particular rope structure as required.

The fourth example rope structure 420 further comprising a jacket structure 440 configured to extend from one end portion of a first end link structure, over all of the intermediate link structures, and to an end of portion of a second end link structure.

The example jacket structures 440 may be made of a number of materials and manufacturing techniques. Examples include synthetic fiber fabric sewn into a tubular shape, a synthetic fiber rope structure woven into a tubular shape, rigid or elastic tubes formed of material such as plastic, latex, or rubber, and/or a coating applied to the link structures 430 and allowed to harden in situ to form a rigid or elastic tube.

The jacket structure 440 facilitates handling of the link structures and, like the organizer members 80 and 82 described above, reduce the likelihood that bend portions of the link structures will cross at the link junctures formed by adjacent links.

Referring now to FIGS. 11-13 of the drawings, depicted therein is a second example link structure 520 that may be used in place of the first example link structures 30 in a rope structure similar to the first example rope structure 20 described above. Each of the second example link structures 520 is formed by a link member 522. The example link members 522 are formed by lengths of fibers combined into a sub-structure and spliced at a termination region 524 such that each of the link members 522 is what is commonly referred to as an endless rope.

The endless rope sub-structure forming the link member 522 may be laid, braided, or woven. The fibers may be continuous along the entire length of the link member 522 outside of the termination region 524, only some of the fibers may be continuous along the entire length of the link member 522 outside of the termination region 524 and the remaining fibers are not continuous along the entire length of the link member 522 outside of the termination region 524, or the link member 522 may be formed of discontinuous fibers none of which are continuous along the entire length of the link member 522 outside of the termination region 524.

The fibers used to form the example link structures 520 are synthetic fibers made of any one or more of the materials as described above with respect to the first example link structure 30.

The details of the splice formed at the termination region 524 depend on the size, construction, and materials used to form the link member 522. The splices used to form the link members 522 may be formed at the factory under controlled conditions. In this case, the consistency of the tensile strength of the link members 522 may controlled and verified before the link member 522 is configured as a link structure 520 and combined with other link structures 520 to form a rope structure as will be described in further detail below.

As shown in FIGS. 12 and 13, each link member 522 is initially folded to define first and second primary loops 530 and 532. A primary crossing point 534 is formed during the formation of the primary loops 530 and 532.

After the first and second primary loops 530 and 532 are formed as shown in FIG. 13, portions of the loops 530 and 532 are folded back onto each other to define first, second, third, and fourth secondary loop portions 540, 542, 544, and 546. The secondary loop portions 540-546 define first and second secondary crossover points 550 and 552 and first and second end portions 560 and 562. The link structure 520 formed as shown in FIG. 11 defines first, second, third, and fourth lateral bend portions 570, 572, 574, and 576 and first, second, third, and fourth vertical bend portions 580, 582, 584, and 586.

The example link structure 520 is formed such that the termination region 524, primary crossover point 534, first and second secondary crossover points 550 and 552 are arranged along the link member 522 outside of the lateral bend portions 570, 572, 574, and 576 and vertical bend portions 580, 582, 584, and 586.

When multiple link structures 520 are linked together to form a rope structure, each of the individual example link structure 520 will tend to take the configuration as generally depicted in FIG. 11 when the rope structure is placed under tension. At each link juncture, the lateral bend portions 570, 572, 574, and 576 are substantially parallel to each other, the vertical bend portions 580, 582, 584, and 586 are substantially parallel to each other, and the lateral bend portions 570, 572, 574, and 576 are substantially orthogonal to the vertical bend portions 580, 582, 584, and 586. This configuration evenly distributes tension loads along the lengths of each of the link structures 520 and also evenly transfers tension loads along the length of the rope structure formed by these link structures 520. Crossing of the bend portions 570, 572, 574, and 576 and 580, 582, 584, and 586 is preferably avoided when placing the second example link structure 520 under tension to reduce wear on the link members 522.

Further, the example termination region 524, primary crossover point 534, and secondary crossover points 550 and 552 are arranged outside of the bend portions 570, 572, 574, and 576 and 580, 582, 584, and 586, so wear that might occur where adjacent link structures 520 engage each other is substantially reduced. However, the termination region may be formed in the bend portions 570, 572, 574, and 576 and 580, 582, 584, and 586 depending on the nature of the termination region as generally described above.

Figure 14:
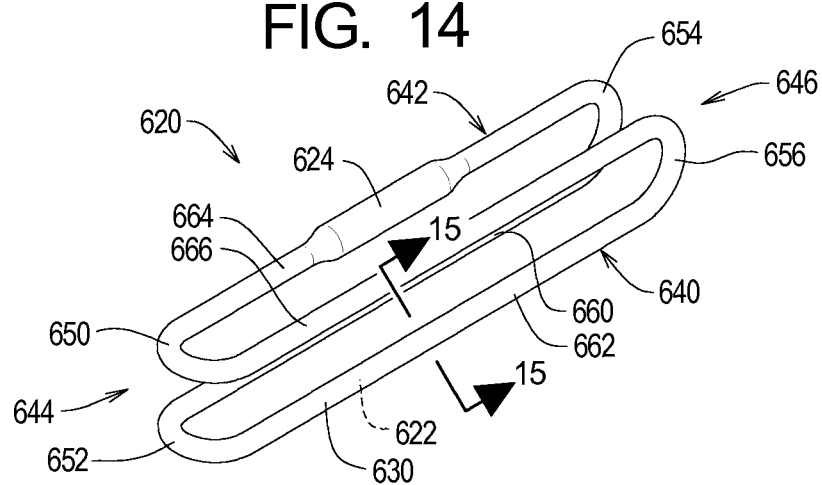
FIG. 14 is a perspective view of a single third example link structure that may be used to form part of the sixth example rope structure.

Referring now to FIGS. 14 and 15 of the drawing, depicted therein is a third example link structure 620 that may be used in place of the first example link structures 30 in a rope structure similar to the first example rope structure 20 described above. The third example link structure 620 is formed by a link member 622. The example link members 622 are formed by lengths of fibers combined into a sub-structure and spliced at a termination region 624 such that each of the link members 622 is what is commonly referred to as an endless rope.

The endless rope sub-structure forming the link member 622 may be laid, braided, or woven. The fibers may be continuous along the entire length of the link member 622 outside of the termination region 624, only some of the fibers may be continuous along the entire length of the link member 622 outside of the termination region 624 and the remaining fibers are not continuous along the entire length of the link member 622 outside of the termination region 624, or the link member 622 may be formed of discontinuous fibers none of which are continuous along the entire length of the link member 622 outside of the termination region 624. And as described above, the example link member 622 may be formed without a termination region 624.

The fibers used to form the example link structures 620 are synthetic fibers made of any one or more of the materials as described above with respect to the first example link structure 30.

The details of the termination region 624 depend on the size, construction, and materials used to form the link member 622 as discussed above with respect to the termination region 34.

Figure 15A:
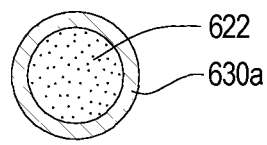
FIG. 15A is a section view taken along lines 15A-15A in FIG. 14 illustrating a first example coating.
Figure 15B:
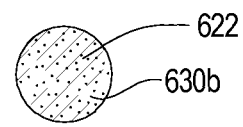
FIG. 15B is a section view similar to FIG. 15A illustrating a second example coating.

As shown in FIGS. 15A and 15B, a coating 630 is applied to each of the link members 622. The example coating 630a shown in FIG. 15A is a thin coat of coating material applied to the link member 622 in liquid form and allowed to dry or cure to form the coating 630. The example coating 630b shown in FIG. 15B extends throughout the fibers in a matrix. The example coating 630a will typically be flexible, while the example coating 630b may be flexible or rigid.

The coating 630 may be formed by spraying, dipping, brushing or otherwise applying the liquid coating material to the link member 622. The link member 622 is configured as the link structure 620 before the coating material is applied thereto and held in the link structure 620 as depicted in FIG. 14 until the coating material dries to form the coating 630. If the coating 630 is highly flexible, the coating material may be applied to the link member 630 prior to formation of the link structure 620. The coating 630 may be formed by a resinous material that dries by removal of water or solvent. The coating 630 may also or instead be formed by a resin material and is or may be a conventional polymeric resin such as a thermoplastic or thermosetting resin, in which case the resin cures by chemical reaction between components forming the resin. In either case, the resin dries or cures to form a matrix of material that forms the coating. The resin material is applied to the link member 622 by wet coating, powder coating, pultrusion, extrusion, or other means such that the resin coats or penetrates the fibers forming link member 622. As examples, the resin may be applied in a fluid (e.g., liquid) or fluidized (e.g., powder) form to facilitate penetration of the fiber bundles and then solidified into the matrix by techniques such as solvent removal, solidification from melting, or chemical curing.

After the example link member 622 is folded to form the link structure 620, the link structure 620 defines first and second loop portions 640 and 642 and first and second end portions 644 and 646, first and second lateral bend portions 650 and 652, and third and fourth bend portions 654 and 656. The first and second lateral bend portions 650 and 652 define the end portion 644, and the third and fourth bend portions 654 and 656 define the end portion 646. First and second lower side portions 660 and 662 and the first and second upper side portions 664 and 666 are also formed when the example link structure 620 is formed.

Figure 18:
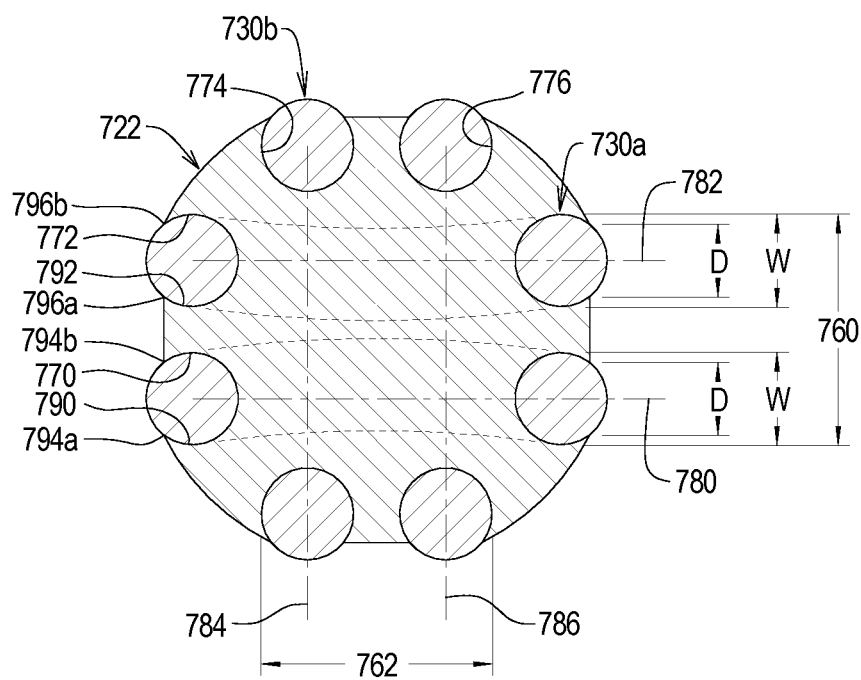
FIG. 18 is a section view taken along lines 18-18 in FIG. 16.

Turning now to FIGS. 16-18 of the drawing, depicted therein is a fifth example rope structure 720 and a second example organizer member 722. The fifth example rope structure 720 comprises first and second link structures 730a and 730b. Each of the example link structures 730 defines a first end 740 and a second end 742. In the example link structures 730, each first end 740 is formed by first and second bend portions 750 and 752, and each second end 742 is formed by third and fourth bend portions 754 and 756. The first and second link structures 730a and 730b may be implemented using any one or more of the link structures described elsewhere herein.

FIGS. 16-18 further illustrate that the second example organizer 722 defines first and second groove pairs 760 and 762. The first groove pair 760 comprises a first groove 770 and a second groove 772, while the second groove pair 762 comprises a third groove 774 and a fourth groove 772. The grooves 770, 772, 774, and 776 define first, second, third, and fourth groove axes 780, 782, 784, and 786, respectively. The second example organizer 722, and in particular the groove pairs 760 and 762 formed therein, therefore defines the bend radius of the ends 740 and 742 of the link structures 730 and the fleet angles at which the rope structures extend away from one organizer 722 and to the next organizer 722 in the chain of link structures 730.

In the second example organizer 722, then, the first and second groove axes 780 and 782 are substantially parallel to each other where adapted to receive bend portions of the link structure 732 as described below and angled slightly away from each other away from the portion adapted to receive bend portions. Similarly, the third and fourth groove axes 784 and 786 are also substantially parallel to each other where adapted to receive bend portions of the link structure 732 as described below and angled slightly away from each other away from the portion adapted to receive bend portions. The first and second groove axes 780 and 782 are substantially perpendicular to the third and fourth groove axes 784 and 786 where grooves are adapted to receive the bend portions. In addition, the first groove pair 760 (first and second grooves 770 and 772) is arranged on an opposing portion of the example organizer 722 from the second groove pair 762 (third and fourth grooves 774 and 776).

The example first and second grooves 770 and 772 are sized and dimensioned to receive the first and second bend portions 750a and 752a of the first link structure 730a, respectively. The example third and fourth grooves 774 and 776 are sized and dimensioned to receive the third and fourth bend portions 754b and 756b of the second link structure 730b, respectively.

The example grooves 770, 772, 774, and 776 engage their respective bend portions 750a, 752a, 754b, and 756b such that the bend portions 750a and 752a do not overlap and such that the bend portions 754b and 756b do not overlap under normal use. Further, the grooves 770, 772, 774, and 776 are curved to prevent severe bend at the bend portions 750a, 752a, 754b, and 756b when the example rope structure 720 is under tension loads by distributing loads along a greater portion of the link members 732.

The grooves 770, 772, 774, and 776 may be configured to mechanically engage the bend portions 750a, 752a, 754b, and 756b to inhibit inadvertently removal of the bend portions 750a, 752a, 754b, and 756b from the grooves 770, 772, 774, and 776, respectively. While the grooves formed in the second example organizer member 722 need not be identical, the example grooves 770, 772, 774, and 776 are identical, so only the first and second grooves 770 and 772 will be described herein in detail.

In particular, as perhaps best shown in FIG. 18, the grooves 770 and 772 each define a curved wall 790 and 792. The curved walls 790 and 792 are sized and dimensioned to receive the bend portions 750a and 752a. Further, the example curved wall 790 defines first and second tip portions 794a and 794b, while the example curved wall 792 defines third and fourth tip portions 796a and 796b. A distance D between the tip portions 794a and 794b and between the tip portions 796a and 796b is slightly narrower than a width dimension W defined by the link members 732 forming the link structures 730a and 730b.

In practice, the bend portions 750, 752, 754, and 756 must be forced between the tip portions 794a and 794b or the tip portions 796a and 796b to place the bend portions 750, 752, 754, and 756 into or remove the bend portions 750, 752, 754, and 756 from any of the grooves 770, 772, 774, and 776. Accordingly, the link structures 730a and 730b are combined with the organizer member 722 to form the rope structure 720. So combined, the organizer member 722 generally maintains the integrity of the rope structure 720 even when the rope structure 720 is not under tension.

In use, tension loads on the rope structure 720 are transferred between the link structures 730a and 730b through the second example organizer member 722. The second example organizer 722 is thus a rigid or semi-rigid member made of material capable of operating in compression to transfer tension loads between the link structures 730a and 730b up to a rated level.

A rope system will typically include the fifth example rope structure 720 made to any desired length by combining a plurality of the link structures 730 to obtain the desired length. The rope structure 720 typically comprises K link structures 730 and K-1 organizer members 722. Termination connectors may be connected to the end link structures as generally described above.

The present invention may be embodied in forms other than the specific examples discussed above.

What is claimed is:

1. A rope structure comprising:
   a plurality of link structures each defining first and second ends, where
       each first end comprises at least first and second bend portions, and
       each second end comprises at least third and fourth bend portions; and
   at least one organizer member; whereby
   the first end of a first one of the plurality of link structures and the second end of a second one of the plurality of link structures engages the at least one organizer member such that the first and second bend portions of the first end of the first one of the plurality of link structures are
       substantially parallel to each other, and substantially perpendicular to the third and fourth bend portions of the second end of the second one of the plurality of link structures.

2. A rope structure as recited in claim 1, in which each link structure is formed of a discrete link member.

3. A rope structure as recited in claim 1, in which each discrete link structure comprises an endless rope structure.

4. A rope structure as recited in claim 1, in which each link structure comprises a termination region, where the link structure is configured such that the termination region is arranged outside of the first, second, third, and fourth bend portions.

5. A rope structure as recited in claim 1, in which each link structure comprises:
   a termination region; and
   a plurality of side portions extending between the first and second ends; wherein
   the link structure is configured such that the termination region is arranged within the one of the plurality of side portions.

6. A rope structure as recited in claim 1, in which each link structure comprises:
   a termination region; and
   first, second, third, and fourth side portions extending between the first and second ends; wherein
   the link structure is configured such that the termination region is arranged within the one of the first, second, third, and fourth side portions.

7. A rope structure as recited in claim 1, further comprising a termination system comprising:
   a sheave member; and
   a coupler member; wherein
   the sheave member engages two bend portions of at least one of the link structures;
   the coupler member engages the sheave member; and
   loads placed on the coupler member are transmitted to the two bend portions of the at least one link structure through the sheave member.

8. A rope structure as recited in claim 1, in which the termination system further comprises a retainer member to secure the two bend portions in a desired orientation relative to the sheave member.

9. A rope structure as recited in claim 1, in which the at least one organizing member is secured to at least one of the link structures to maintain a relationship between the at least first and second bend portions of the at least one of the link structures during use of the rope structure.

10. A rope structure as recited in claim 1, further comprising at least one jacket structure, where the at least one jacket structure covers at least a portion of at least one of the link structures.

11. A rope structure as recited in claim 1, further comprising at least one jacket structure, where the at least one jacket structure covers at least a portion of at least two of the link structures.

12. A rope structure as recited in claim 1, in which at least one link structure comprises a link member, the rope structure further comprising a coating applied to cover at least a portion of the link member.

13. A method of forming rope structure comprising the steps of:
   providing a plurality of link members formed of synthetic fibers;
   configuring at least two of the link members to form first and second link structures each comprising
      at least first and second bend portions defining a first end of the link structure, and
      at least third and fourth bend portions defining a second end of the link structure;
   providing at least one organizing member;
   engaging the first end of the first one of the plurality of link structures and the second end of the second one of the plurality of link structures with the at least one organizer member such that the first and second bend portions of the first end of the first one of the plurality of link structures are
      substantially parallel to each other, and
      substantially perpendicular to the third and fourth bend portions of the second end of the second one of the plurality of link structures.

14. A method as recited in claim 13, further comprising the steps of
   forming a termination region in each link members;
   arranging the termination region outside of the first, second, third, and fourth bend portions when the at least two of the link members are configured to form the first and second link structures.

15. A method as recited in claim 13, further comprising the step of securing at least one organizing member to at least one of the link structures to maintain a relationship between the at least first and second bend portions of the at least one of the link structures during use of the rope structure.

16. A method as recited in claim 13, further comprising the step of the arranging at least one jacket structure to cover at least a portion of at least one of the link structures.

17. A method as recited in claim 13, further comprising the step of the applying a coating to cover at least a portion of the link member.

18. A rope structure comprising:
   a plurality link members formed of synthetic fibers spliced at a termination region to form an endless rope structure, where each endless rope structure is folded to form a link structure defining first and second ends, where
      each first end comprises at least first and second bend portions, and
      each second end comprises at least third and fourth bend portions; and
   at least one organizer member; whereby
   the first end of a first one of the plurality of link structures engages and the second end of a second one of the plurality of link structures engages the at least one organizer such that the first and second bend portions of the first end of the first one of the plurality of link structures are
      substantially parallel to each other,
      substantially perpendicular to the third and fourth bend portions of the second end of the second one of the plurality of link structures, and
   the termination region is arranged outside of the first, second, third, and fourth bend portions.

19. A rope structure as recited in claim 18, further comprising at least one organizing member, where the at least one organizing member is secured to at least one of the link structures to maintain a relationship between the at least first and second bend portions of the at least one of the link structures during use of the rope structure.

20. A rope structure as recited in claim 18, further comprising at least one jacket structure, where the at least one jacket structure covers at least a portion of at least one of the link structures.

21. A rope structure as recited in claim 18, further comprising a coating applied to cover at least a portion of the link member.

* * * * *